United States Patent
Arasu et al.

(10) Patent No.: US 7,610,283 B2
(45) Date of Patent: Oct. 27, 2009

(54) DISK-BASED PROBABILISTIC SET-SIMILARITY INDEXES

(75) Inventors: Arvind Arasu, Redmond, WA (US); Venkatesh Ganti, Redmond, WA (US); Shriraghav Kaushik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 11/761,425

(22) Filed: Jun. 12, 2007

(65) Prior Publication Data
US 2008/0313128 A1 Dec. 18, 2008

(51) Int. Cl.
G06F 17/30 (2006.01)
G06F 7/06 (2006.01)
G06F 7/08 (2006.01)
G06F 7/10 (2006.01)

(52) U.S. Cl. .............. 707/5; 707/1; 707/2; 707/3; 707/7; 707/100

(58) Field of Classification Search .......... 707/1, 707/2, 3, 5, 7, 100
See application file for complete search history.

(56) References Cited

U.S. PATENT DOCUMENTS

| | | | |
|---|---|---|---|
| 5,497,486 A * | 3/1996 | Stolfo et al. ............. | 707/7 |
| 6,032,146 A | 2/2000 | Chadha et al. | |
| 6,236,985 B1 * | 5/2001 | Aggarwal et al. ........ | 707/2 |
| 6,260,038 B1 | 7/2001 | Martin et al. | |
| 6,675,174 B1 | 1/2004 | Bolle et al. | |
| 6,681,222 B2 * | 1/2004 | Kabra et al. ............. | 707/5 |
| 6,922,700 B1 | 7/2005 | Aggarwal et al. | |
| 7,031,555 B2 | 4/2006 | Troyanker | |
| 7,043,474 B2 | 5/2006 | Mojsilovic et al. | |
| 2004/0260694 A1 * | 12/2004 | Chaudhuri et al. ........ | 707/5 |
| 2005/0262144 A1 | 11/2005 | Teng et al. | |
| 2007/0094024 A1 * | 4/2007 | Kristensson et al. ...... | 704/252 |

OTHER PUBLICATIONS

White, et al., "Similarity Indexing with the SS-tree", IEEE, 1996, pp. 516-523.
White, et al., "Similarity Indexing: Algorithms and Performance", Proceedings SPIE, vol. 2670, pp. 1-12.
Seidl, et al., "Optimal Multi-Step k-Nearest Neighbor Search", SIGMOD'98, ACM, 1998, pp. 154-165.
Katayama, et al., "The SR-tree: An Index Structure for High-Dimensional Nearest Neighbor Queries", SIGMOD'97, ACM, 1997, pp. 369-380.

* cited by examiner

*Primary Examiner*—James Trujillo
*Assistant Examiner*—William Spieler

(57) ABSTRACT

Input set indexing for set-similarity lookups. The architecture provides input to an indexing process that enables more efficient lookups for large data sets (e.g., disk-based) without requiring a full scan of the input. A new index structure is provided, the output of which is exact, rather than approximate. The similarity of two sets is specified using a similarity function that maps two sets to a numeric value that represents similarity of the two sets. Threshold-based lookups are addressed where two sets are considered similar if the numeric similarity score is above a threshold. The structure efficiently identifies all input sets within a distance k (e.g., a hamming distance) of the query set. Additional information in the form of frequency of elements (the number of input sets in which an element occurs) is used to improve index performance.

16 Claims, 12 Drawing Sheets

DISK-BASED PROBABILISTIC SET-SIMILARITY INDEXES

BACKGROUND

Data cleaning is the process of fixing inconsistencies in data before the data is used for analysis. A common form of inconsistency arises when the same semantic entity has multiple representations in a data collection. For example, the same address could be encoded using different strings in different records in the collection. Multiple representations arise due to a variety of reasons such as misspellings and different formatting conventions.

A string-similarity lookup is a useful primitive for fixing such representational data inconsistencies. A string-similarity lookup identifies all strings in a collection that are similar to a query string. For example, a City column of an unclean table that contains possibly misspelled city names can be cleaned by performing a string-similarity lookup against a reference table of city names with correct spellings. Alternatively, each city name in the unclean table could be replaced with the most similar city name in the reference table.

String-similarity lookups are also useful in several other applications. Identifying documents that are textually similar to a given document is useful in many contexts such as identifying mirrors on the Internet and copy detection. There is an increasing interest in supporting large text data within database management systems, and string-similarity lookups are likely to occur naturally in such settings.

A common primitive useful in data cleaning and other applications is that of identifying all sets in a collection similar to a given query set. However, conventional mechanisms for indexing such sets for efficient set-similarity lookups continue to be problematic.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides input to an indexing process that enables more efficient lookups for large data sets (e.g., disk-based) without requiring a full scan of the input. More specifically, a new index structure is provided that supports set-similarity lookups, the output of which is exact, rather than approximate. In other words, no output set is missed, probabilistically. With respect to set-similarity lookups, given a query set, all sets in an input collection similar to the query set are identified. The similarity of two sets is specified using a similarity function that maps two sets to a numeric value that represent similarity of the two sets. Threshold-based lookups are addressed where two sets are considered similar if the numeric similarity score is above a predetermined threshold. This can also be extended to handle top-k lookups.

The architecture is a new index structure (referred to as PARTENUM) for set-similarity lookups. The structure efficiently identifies all input sets within a distance k (e.g., a hamming distance) of the query set. PARTENUM supports exact set-similarity lookups. Unlike locality-sensitive hashing (LSH) based indexes, PARTENUM does not miss lookup output probabilistically. For simple uniform input distributions PARTENUM can achieve sublinear query time using subquadratic space (query time and space are both functions of the number of input sets).

PARTENUM uses additional information in the form of frequency of elements (the number of input sets in which an element occurs), information not used by LSH. More specifically, PARTENUM is designed to exploit the fact that for real life sets a vast majority of elements are relatively infrequent. Informally, infrequent elements are useful for set-similarity indexing since they help quickly narrow down the space candidates for a lookup query. Additionally, simple modifications can be made to the LSH indexes that make the resulting index structure better manageable and more efficient in a disk-based setting.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
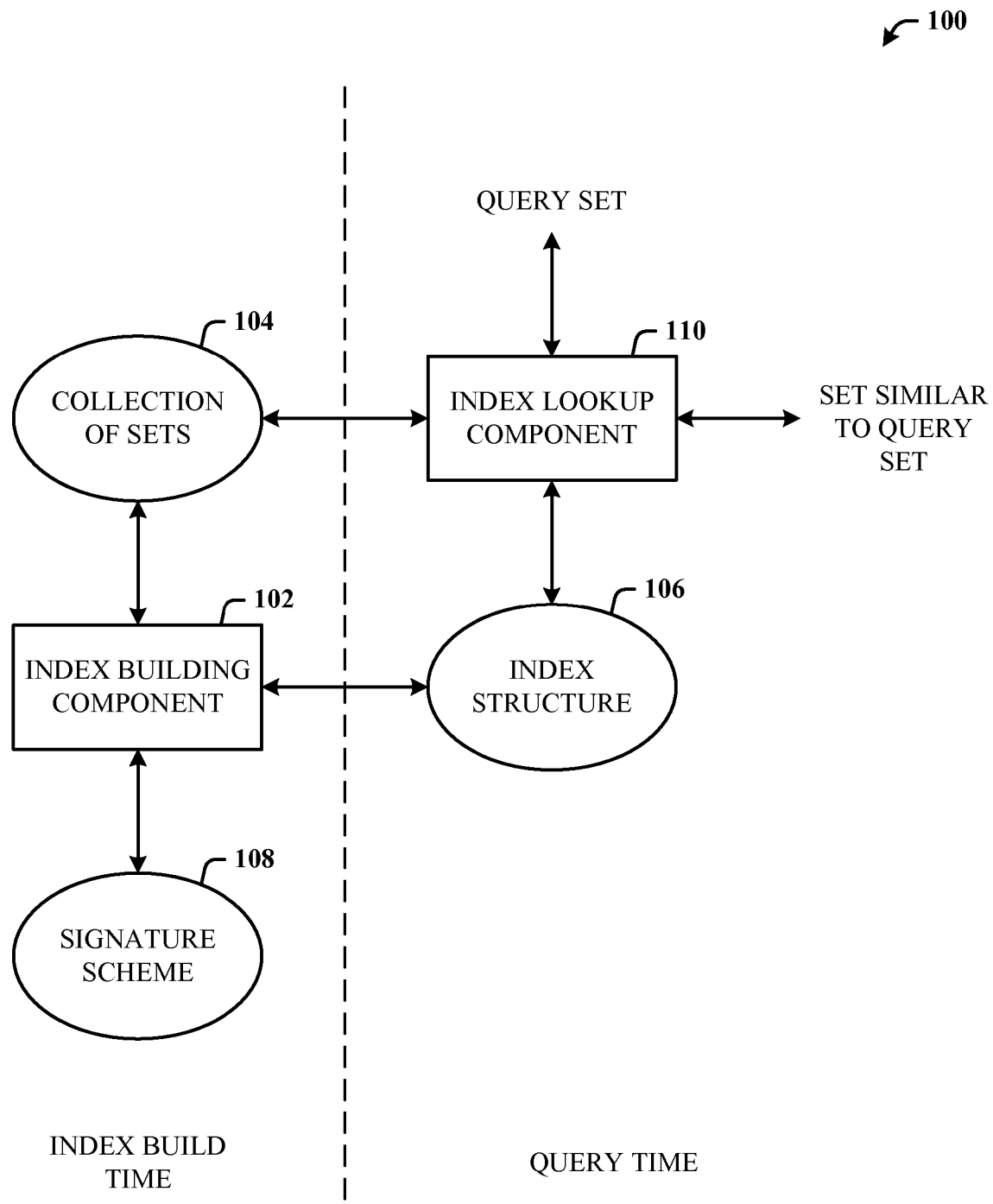
FIG. 1 illustrates a computer-implemented indexing system for set-similarity lookup.

The disclosed architecture provides for the efficient retrieval of all sets in a large collection of sets that are similar to a given query set. For Jaccard and hamming similarity functions over unweighted and weighted sets (and hence, the class of string similarity which can be built upon these functions), efficient techniques are disclosed based on a signature scheme (referred to as monotonic PARTENUM). A set similarity lookup algorithm built upon the signature scheme achieves sublinear lookup time when input sets are uniformly distributed. Also disclosed are techniques for significantly reducing the resultant index size by exploiting the flexibility in the lookup algorithm, and consequently significantly reducing the overall lookup time. The proposed techniques can be used to index a string column of a relational database table for string-similarity lookups by defining a suitable mapping from strings to sets such as n-gram or word-based tokenization.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented indexing system 100 for set-similarity lookup. The system 100 includes an index building component 102 that processes an input collection of sets 104 and builds an index structure 106 using a signature scheme 108. The system 100 also includes an index lookup component 110 that takes a query set and returns all the sets in the input collection of sets 104 that are similar to the query set using the constructed index structure 106.

As will be described in greater detail hereinafter, the index structure 106 is disk-based, and the set-similarity lookup is threshold-based. The set-similarity function used in the lookup can be based on one of Jaccard similarity or hamming distance. The signature scheme 108 is based on partitions of a multi-dimensional vector representation of sets, and further based on enumeration of the partitions.

The index structure 106 supports set-similarity lookups the output of which is exact (that is, no output set is missed probabilistically). The index structure 106 achieves sub-linear query time using sub-quadratic space for simple input distributions. The index 106 is disk-based and can efficiently handle large data sets. Well-known probabilistic indexing techniques based on locality-sensitive hashing are considered and simple modifications proposed that make the resulting index structure more efficient and better manageable in a disk setting.

Set-similarity lookups are defined as follows. Given a query set, all sets in an input collection (hereafter, simply input) similar to the query set (hereafter, simply query) are identified. Set-similarity lookups can be used with appropriate pre- and post-processing for evaluating string-similarity lookups. The input is preprocessed to enable efficient lookups, without requiring a full scan of the input. The similarity of two sets is specified using a similarity function, which maps two sets to a numeric value that represents similarity between the two sets. The disclosed architecture employs threshold-based lookups, where two sets are considered similar if a numeric similarity score is above a specified threshold. A related variant is the top-k lookup, which seeks the k sets in the input most similar to the query. Indexing techniques described for threshold-based lookups can be extended to handle top-k lookups.

For various efficiency and ease-of-implementation reasons, it is useful to move from a sequence abstraction to a set abstraction for defining similarity. Strings are converted to sets using conventional techniques such as n-gram computation, shingling, and word tokenization. The similarity of strings is then defined to be the similarity of the corresponding sets using a set-similarity measure such as Jaccard and cosine. While this method discards some sequence information, in practice, it is fairly robust in capturing similarity of real-world strings and text data. Even when lookups based on string-similarity measures are important, it is beneficial to use set-similarity measures during an intermediate filtering step. For example, in order to identify strings that are within edit distance of one from the string November, strings that share at least five 2-grams with November can first be identified, and then false positives eliminated.

Figure 2:
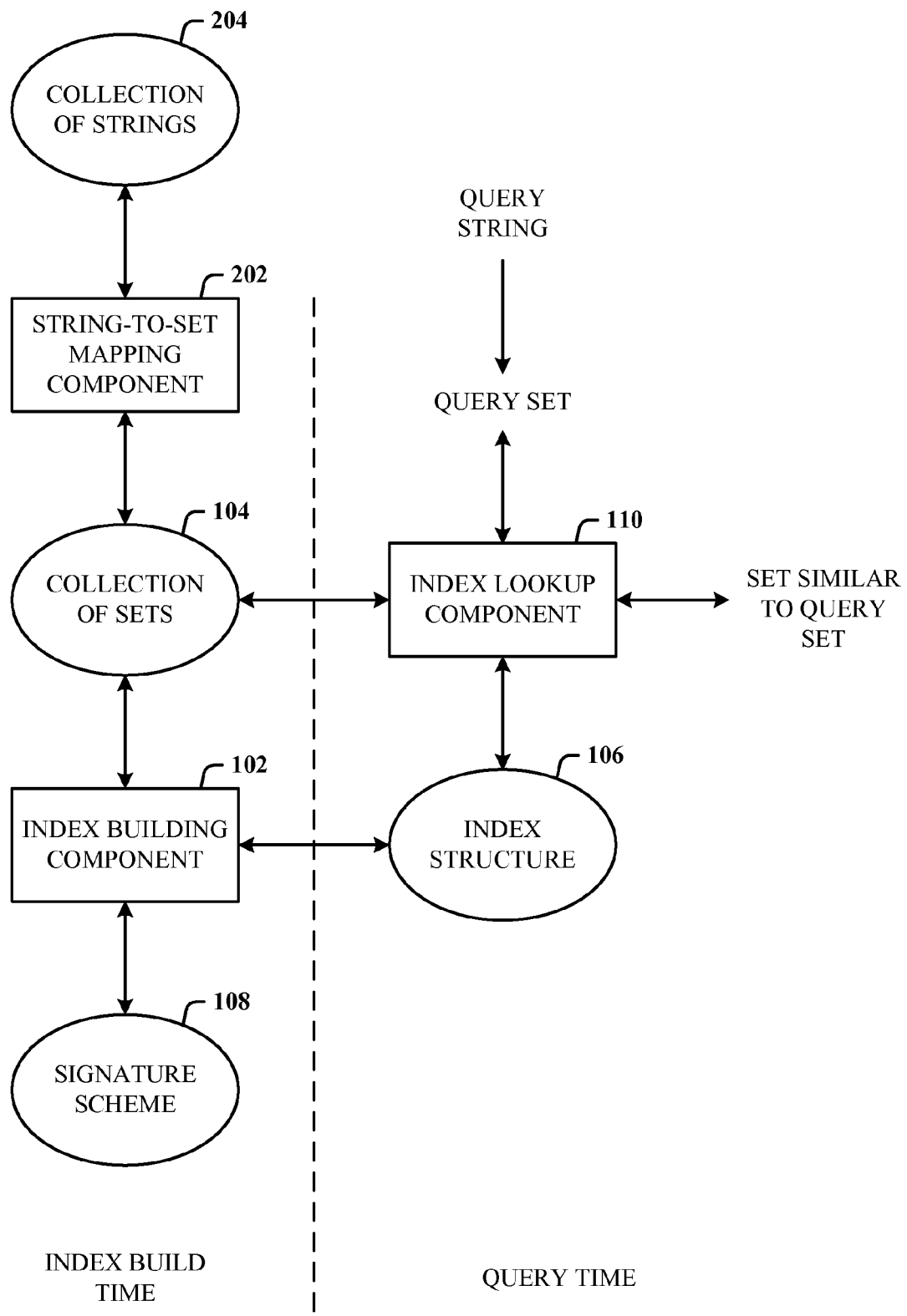
FIG. 2 illustrates a system that employs the system of FIG. 1 for indexing strings.

FIG. 2 illustrates a system 200 that employs the system 100 of FIG. 1 for indexing strings. A mapping component 202 converts a collection of input strings 204 to the collection of sets 104, which sets 104 are then passed as input to the index building component 102. Similarly, at query time, a query string is first converted to the query set and passed as input to the index lookup component 110.

One possible approach for indexing sets is to build an inverted index that stores, for each element, the list of sets containing it. The inverted index can be used to answer similarity lookups for a variety of similarity functions. For example, all input sets having an intersection size at least T with a query q can be identified by accessing the set-lists of all the elements in q and identifying those sets that occur in at least T of these lists. For large data collections, this approach is not very efficient, since the set-lists associated with elements could be large.

A better approach for indexing sets uses the idea of locality-sensitive hashing (LSH). LSH-based indexing is a general technique that relies on a "black-box" called locality-sensitive hashing scheme. A class of objects whose similarity measure admits an LSH scheme can be indexed using this technique. LSH-based indexing is formally introduced infra. There exist well-known LSH schemes for standard set-similarity measures such as Jaccard and cosine. Therefore, in principle, these LSH schemes can simply be plugged in to get a similarity index for sets. However, there are several reasons why the set-similarity indexing is far from being a completely "solved" problem.

First, LSH indexes support only probabilistically approximate lookups. In other words, LSH indexes miss an answer set with a small probability. There are several scenarios where exact, as opposed to approximate, lookups are desirable. Such scenarios commonly arise when set-similarity lookup operation occurs as part of a larger query—this is often the case in data cleaning or in a general-purpose database management system (DBMS). It is difficult to assign meaningful semantics to the full query when an operator of the query produces approximate answers.

Second, although there has been an enormous amount of theoretical work on LSH indexes, the practical aspects of LSH indexes have not been sufficiently studied. For example, the construction of LSH indexes involves parameters, whose values crucially influence the lookup performance of the indexes. It is not clear how these parameters should be set for real life data. The values for these parameters suggested by theoretical analysis are derived using a conservative assumption that input sets are highly similar to one another, and LSH indexes constructed using these values are not practical for large input. There exist practical variants of LSH indexes that achieve better performance for real life data. However, these are mostly ad hoc adaptations and do not provide correctness guarantees about their lookup output.

As previously indicated, the disclosed architecture is a new index structure (e.g., disk-based) called PARTENUM for set-similarity. PARTENUM supports exact set-similarity lookups. Unlike LSH based indexes, the structure does not miss any lookup output probabilistically. PARTENUM has a sound theoretical basis. For simple uniform input distributions it can be proved that PARTENUM achieves sublinear query time using subquadratic space (query time and space are both functions of the number of input sets).

The disclosed index structure uses additional information in the form of frequency of elements (the number of input sets in which an element occurs), information not used by LSH. More specifically, the index structure is designed to exploit the fact that for real life sets a vast majority of elements are relatively infrequent. Informally, infrequent elements are useful for set-similarity indexing since the infrequent elements help to quickly narrow down the space candidates for a lookup query.

Finally, a simple modification to the LSH indexes is disclosed that makes the resulting index structure more manageable and efficient (e.g., in a disk-based setting).

The input to the indexing problem consists of n sets that are denoted $S=\{s_1, s_2, \ldots, s_n\}$ where n is a positive integer. For simplicity, it is assumed that all sets are drawn from the universe $U=\{1, \ldots, m\}$. A goal is to index the collection S so as to support lookups involving a fixed similarity function Sim defined as the following:

Given a query set q and a similarity threshold $\theta$, output all sets $s_i \in S$ satisfying $Sim(q, s_i) \geq \theta$.

For probabilistically approximate lookups (hereafter, referred to generally as approximate lookups), the output can be slightly inaccurate, as quantified using a parameter $\delta$; any output set $s_i \in S$ satisfying $Sim(q, s_i) \geq \theta$ appears in the output with a probability at least $(1-\delta)$.

Figure 3:
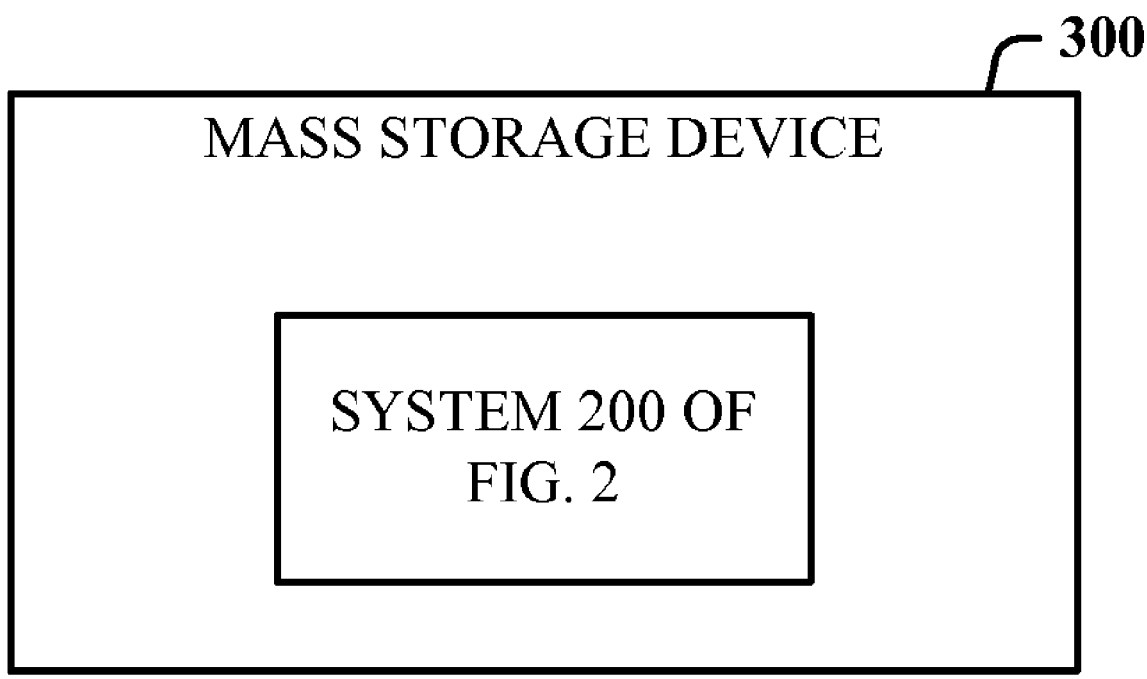
FIG. 3 illustrates a disk-based implementation of the similarity lookup architecture.

FIG. 3 illustrates a disk-based implementation of the similarity lookup architecture. A mass storage device 300 such as a hard drive can employ the system 200 of FIG. 2 for data storage, indexing and retrieval. Although described throughout this description in the context of disk-based storage, other types of storage can be employed, such as chip-based storage, and so on.

The following description deals primarily with two similarity (distance) functions, Jaccard, and hamming, defined below. Set-similarity indexes constructed for one of these similarity functions can be used as a pre-filter for lookups involving a broader class of similarity functions. The Jaccard similarity of two sets $s_1$ and $s_2$, denoted $\mathfrak{J}_s(s_1, s_2)$ is given by:

$$\mathcal{J}_s(s_1, s_2) = \frac{|s_1 \cap s_2|}{|s_1 \cup s_2|}$$

$\mathfrak{J}_s(s_1, s_2)$ is a fraction between 0 and 1.

EXAMPLE 1

Consider the 3-Gram Sets of the Strings Washington and Woshington Below:

$s_1$={was, ash, shi, hin, ing, ngt, gto, ton}

$s_2$={wos, osh, shi, hin, ing, ngt, gto, ton}

The Jaccard similarity of the two sets is 6/10=0.6. A set $s \subseteq \{1, \ldots, m\}$ can be viewed as an m-dimensional binary vector v, such that $v[i]=1$ if $i \in s$, and $v[i]=0$, otherwise ($v[i]$ denotes the value of vector v on the ith dimension). The hamming distance between two vectors $v_1$ and $v_2$, denoted $H_d(v_1, v_2)$, is the number of dimensions on which the two differ. As used herein, the hamming distance between two sets can be understood to mean the hamming distance of the vector representations. Note that the hamming distance between two sets $s_1$ and $s_2$ is the size of the symmetric difference: $H_d(s_1, s_2) = |(s_1-s_2) \cup (s_2-s_1)|$. For example, the hamming distance between the two sets of Example 1 is four.

Herein is a high-level description of a general index structure for set-similarity. This general index captures the common logic of all previous indexes such as LSH as well as the PARTENUM index, and therefore, helps in the introduction of uniform terminology to describe the different indexes as well as the differences. Following is a general set-similarity index.

Index Construction
1. for every $\theta \geq \theta_{min}$:
2. for every set $s_i \in S$:
3. generate the set of signatures $Sign(s_i, \theta)$
4. for each $sig \in Sign(s_i, \theta)$ insert $\langle sig, s_i \rangle$ into a hash table with sig as the key.

Lookup: (q, $\theta$)
1. Generate the set of signatures $Sign(q, \theta)$ for query q.
2. Use the hash table to retrieve all candidate sets $s_i \in S$ satisfying $Sign(s_i, \theta) \cap Sign(q, \theta) \neq \phi$.
3. Output candidate sets $s_i$ satisfying $Sim(q, s_i) \geq \theta$.

The index uses a special mapping that takes a set s and produces another set of values called signatures of the original set, the set of signatures denoted $Sign(s, \theta)$. The mapping is parameterized by a numeric value $\theta$. Thus, it is possible that a set has different signatures for different values of $\theta$. At index construction time, the set of signatures $Sign(s_i, \theta)$ is generated for each input set $s_i$ and every lookup threshold $\theta$. Each signature $sig \in Sign(s_i, \theta)$ is inserted along with the set $s_i$ into a hash table, with sig as the hash table key.

In order to perform a lookup involving query set q and threshold $\theta$, the signatures $Sign(q, \theta)$ of query q are generated. The hash table is used to retrieve all input sets $s_i$ that share a signature with q, and the input sets that satisfy the lookup predicate $Sim(q, s_i) \geq \theta$ are output. Note that the term "hash table" is used loosely herein to mean a data structure that indexes a set of vector pairs (key, value), and supports a lookup operation that takes a key and returns all values with the given key. In particular, the data structure may or may not involve hashing.

The mapping that generates signatures is called a signature scheme. A signature scheme that satisfies the following condition results in a correct set-similarity index for similarity function Sim: for any sets r and s, $Sign(r) \cap Sign(s) \neq \phi$ whenever $Sim(r, s) \geq \theta$. This condition can be satisfied only probabilistically, which results in the index being probabilistically approximate. Such signature schemes are called approximate, and signature schemes that deterministically satisfy the correctness condition, exact.

Ignoring the low-level implementation details, most of the previous indexes for set-similarity can be viewed as instantiations of the general set-similarity index above with a specific signature scheme. A simple signature scheme is the identity scheme, where the set of signatures for a set is the set itself ($Sign(s, \theta)=s$). The set-similarity index resulting from this scheme corresponds to the inverted index based approach briefly described above. For LSH-based indexes, signatures of a set are concatenations of minhashes of the set, described in greater detail below. The PARTENUM index described herein uses a signature scheme, also called PARTENUM.

With respect to set-similarity indexes, first, it can be impractical to generate signatures for every value of threshold $\theta$ (see Step 1 of INDEX CONSTRUCTION for the general set-similarity index above), since $\theta$ could be a real number. All previous signature schemes and the PARTENUM scheme employed satisfy the desirable monotonicity property: $Sign(s, \theta_2)$ ⊆ Sign(s, θ$_1$) whenever θ$_1$≦θ$_2$. With this property, it is sufficient to generate signatures only at a minimum lookup threshold θ$_{min}$.

Second, there are different implementation alternatives for removing false positives, in Step 3 of the lookup operation for the general set-similarity index above, and the alternatives have very different performance characteristics in a disk setting. The first alternative (suggested in the general set-similarity index above) is to physically store a set in the hash table along with each of its signatures. If a set has multiple signatures (which is typically the case) the set is replicated several times in the hash table. In this case, the hash table lookup in Step 2 returns the full candidate sets; thus, checking for false positives in Step 3 of the lookup is straightforward. A drawback of this approach can be the extra storage space needed for storing multiple copies of input sets. A second alternative is to store just the set identifiers in the hash table. In other words, insert ⟨sig, i⟩ into the hash table in Step 4 of index construction, and not ⟨sig, s$_i$⟩, as given. In support of this second alternative, Step 3 of the lookup is modified to first retrieve a candidate set s$_i$ using its identifier i, thereby incurring an expensive disk seek, before checking if it is a false positive. In one implementation, the former approach is employed as the primary application, since it is more efficient, and extra space is not a serious issue for the relatively small cardinality sets that arise in data cleaning.

Third, the notation Sign(s, θ) is slightly over generalized, since the set of signatures for s is not a function of s and θ alone. There are usually several "hidden" parameters which determine the set of signatures for s. These may include, for example, randomization bits. When using Sign(s, θ) the hidden parameters should be clear from the context. Note that the same settings of hidden parameters should be used for generating all signatures.

Following is a description of the PARTENUM index as the index structure. In one implementation, PARTENUM is designed for hamming distance lookups, by efficiently identifying all input sets within a hamming distance k of a query set. PARTENUM can also be used to support Jaccard similarity lookups as well. For any set s, if $$\mathcal{J}_s(q, s) \geq \theta, \mathcal{H}_d(q, s) \leq |q|\left(\frac{1-\theta}{\theta}\right).$$

Therefore, a Jaccard similarity lookup can be implemented with threshold θ, by first performing a hamming distance lookup with threshold $$|q|\left(\frac{1-\theta}{\theta}\right)$$

using a PARTENUM index, and removing false positives.

The PARTENUM index can be obtained by instantiating the general set-similarity index above with a particular signature scheme called the PARTENUM scheme. The PARTENUM signature scheme generates signatures parameterized by an integer value k with the property that for any two sets r, s, Sign(r, k)∩Sign(s, k)≠φ whenever H$_d$(r, s)≦k. A basic version of the PARTENUM signature scheme for the related set-similarity join problem, as disclosed outside of this description, was defined as follows: Given two collections of sets R and S, identify all pairs (r, s)∈R×S, such that H$_d$(r, s)≦k.

The basic PARTENUM signature scheme cannot be used directly for indexing purposes. First, the basic PARTENUM scheme does not satisfy the monotonicity property: k$_1$≦k$_2$ does not imply Sign(s, k$_1$)⊆Sign(s, k$_2$). The monotonicity property is not crucial for set-similarity join, since each instance of join involves a single value of hamming threshold.

In contrast, the disclosed indexing problem can require lookup support for a range of threshold values. Without monotonicity, different signatures need to be generated for every value of the threshold, increasing the space requirements and index build time. Second, as described infra, the basic PARTENUM scheme involves several parameters which greatly influence its performance, and it is not obvious how these parameters should be picked for indexing. For the join setting, simply estimate the performance for various settings of parameters (e.g., through sampling the input) and pick the best setting. This approach is not possible in the disclosed indexing case.

The instant description provides how PARTENUM scheme parameters should be picked. These results are also necessary to make the basic PARTENUM signature scheme monotonic in a principled way. The disk-based implementation of the PARTENUM index described herein incorporates several heuristics that exploit the skewed distribution of element frequencies in real life data, and which translates to significant performance benefits.

For simplicity, the PARTENUM scheme is described for the binary vector representation of sets. Recall the assumption that sets are drawn from the universe {1, . . . , m}, so the binary vectors under consideration are m-dimensional. As the name suggests, PARTENUM is based on two ideas for signature generation—partitioning of dimensions and enumeration of various subsets of partitions.

Following is the formal specification of the basic PARTENUM signature scheme.

Parameters:
Hamming distance threshold: k
Number of first-level partitions: n$_1$, n$_1$≦k+1
Number of second-level partitions: n$_2$, n$_1$n$_2$>k+1
A random permutation π of {1, . . . , m}
Definitions:

1. Define $b_{ij} = \frac{m(n_2\overline{i-1} + j - 1)}{n_1 n_2}$; $e_{ij} = \frac{m(n_2\overline{i-1} + j)}{n_1 n_2}$ 2. Define $p_{ij} = \{\pi(b_{ij}), \pi(b_{ij} + 1), \ldots, \pi(e_{ij} - 1)\}$ 3. Define $k_2 = \frac{k+1}{n_1} - 1$ Signature for v:
1. Sign(v, k)=φ
2. For each i in {1, . . . , n$_1$}
3. For each subset S of {1, . . . , n$_2$} of size n$_2$−k$_2$
4. Let P=∪$_{j∈S}$p$_{ij}$
5. Sign(v, k)=Sign(v, k)+⟨v[P],P⟩

First, a random permutation π of the dimensions {1, . . . , m} is generated. π is used to define a two-level partitioning of the dimensions: there are n$_1$ first-level partitions, and within each first-level partition, there are n$_2$ second-level partitions. Therefore, there are n$_1$×n$_2$ second-level partitions overall. The values n$_1$ and n$_2$ are parameters that can be varied to control signature generation by PARTENUM. Each (first- or second-level) partition contains a set of dimensions contiguous under permutation π. The permutation π is of the form {π(i): b≦i<e}. p$_{ij}$ is used to denote the jth second-level partition within the ith first level partition. The formal definition of $p_{ij}$ is provided above in the specification. The random permutation $\pi$, and therefore the partitioning, is generated only once. The signatures for all sets are generated using the same partitioning of the dimensions.

A description is now provided of how the signatures for a vector v are generated. Let k denote the hamming threshold at which signatures are generated. Fix $$k_2 = \frac{k+1}{n_1} - 1.$$

For each first-level partition, generate all possible subsets of second-level partitions of size $(n_2-k_2)$. There are exactly $$\binom{n_2}{k_2}$$

such subsets. One signature corresponding to each subset is generated.

Fix a subset S, and let P denote the set of all dimensions belonging to partitions in S. The signature for S is the pair $\langle v[P], P \rangle$, where v[P] denotes the projection of vector v along dimensions in P. For example, if v=01010101, v[{1, 2, 8}]=011.) Note that two signatures $\langle v_1[P_1], P_1 \rangle$ and $\langle v_2[P_2], P_2 \rangle$ are equal only if both the projections $(v_1[P_1]=v_2[P_2])$ and the subsets $(P_1=P_2)$ are equal. The total number of signatures for v is therefore $n_1$.

$$\binom{n_2}{k_2}.$$

EXAMPLE 2

Figure 4:
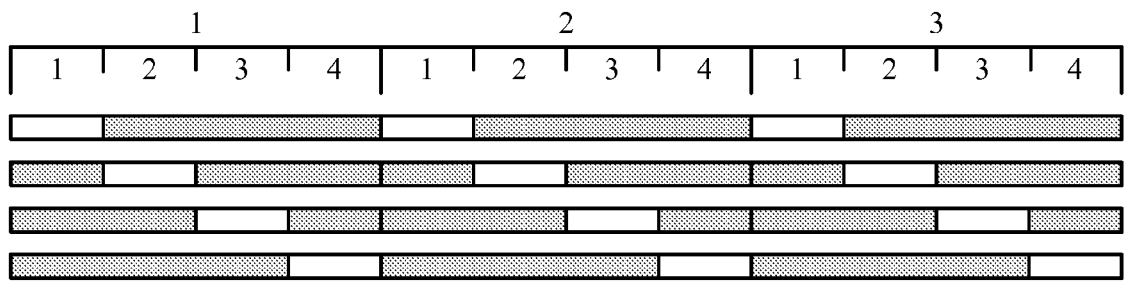
FIG. 4 illustrates a graph that represents signature generation based on the basic PARTENUM signature scheme.

FIG. 4 illustrates a graph 400 that represents signature generation based on the basic PARTENUM signature scheme. The signature scheme represented is for for $n_1=3$, $n_2=4$, and k=5. By definition, $k_2=1$. For each first-level partition, one signature corresponding to every second-level partition subset of size 3 is generated. Therefore, there are 3×4=12 signatures for every vector. These signatures are represented as horizontal rectangles in FIG. 4. The darkened portion of a rectangle indicates the dimensions along which a vector is projected for generating the corresponding signature. Note that the dimensions are ordered according to the permutation $\pi$.

Theorem 1. If $H_d(u, v) \leq k$, Sign(u, k)∩Sign(v, k)≠$\phi$, where Sign(u, k) and Sign(v, k) are generated using the same random permutation $\pi$, and same parameters $n_1$ and $n_2$.

Following is a description of the theoretical performance of the basic PARTENUM signature scheme. For simplicity, binary vectors and strings are used interchangeably. The lookup performance of a set-similarity index depends on the number of input sets that share a given query signature and the total number of signatures per query set. Informally, for the PARTENUM scheme, the number of input sets that share a given signature depends on the width of signatures, which is the number of dimensions along which to project to generate signatures (the cardinality of P in the basic PARTENUM signature scheme above, Step 4). Note that for the PARTENUM signature scheme the width of all signatures is the same, and is given by $$\binom{m}{n_1}\left(\frac{n_2-k_2}{n_2}\right).$$

For example, if the input vectors are generated from a uniform distribution, where each dimension is 1 or 0 with equal probability, the number of input sets that share any given signature is $n/2^w$, for signatures of width w. The following theorem gives the relationship between the number of signatures per vector and the width of signatures.

Theorem 2. There exists a setting of parameters $n_1$ and $n_2$ for which PARTENUM generates $O(16^{wk/m})$ signatures per set, while ensuring that the width of each signature is at least w. Here k denotes the hamming threshold.

The proof of Theorem 2 (omitted here for brevity) provides best values for $n_1$ and $n_2$ for a fixed width of signatures. The best values turn out to be $n_1=m/2w$, $k_2 \approx k/n_1$, and $n_2=2k_2$. The value of n1 is independent of the threshold k, and this fact is used while extending the basic PARTENUM signature scheme to satisfy the subset property. The following theorem asserts that there is marginal improvement for an exact signature scheme that generates signatures by projecting on fixed subsets of dimensions.

Theorem 3. Consider an exact signature scheme for binary vectors and hamming threshold k that generates t signatures by projecting input vectors on fixed sets of dimensions $D_1, \ldots, D_t$, $D_i \subseteq \{1, \ldots, m\}$. If $|D_i| \geq w$ for each $1 \leq i \leq t$, then $t \geq e^{wk/m}$.

A simple consequence of Theorem 2 is the following theorem, which summarizes the performance of PARTENUM when the input vectors are generated from a uniform distribution. The proof of the theorem essentially fixes the width signatures to be $\log_2 n$ and applies Theorem 2; for this value of width, the expected number of input vectors that share a signature is one.

Theorem 4. For input vectors generated from a uniform distribution, PARTENUM index achieves a lookup time of $n^{4k/m}$ using $n^{1-4k/m}$ index space.

Therefore, for k<m/4, PARTENUM index achieves sublinear query time using subquadratic space when input vectors are generated from a uniform distribution.

Following is a description of how the basic PARTENUM signature scheme can be used to derive a monotonic signature scheme for hamming distance, that is, a signature scheme that satisfies Sign(s, $k_1$)⊆Sign(s, $k_2$) if $k_1 \leq k_2$.

Collectively, use l instances of the basic PARTENUM signature scheme, denoted $PE_1, \ldots, PE_l$, to derive the monotonic scheme. Value l is a parameter for the monotonic scheme that determines the lowest hamming threshold handled. Following is an algorithm for a monotonic scheme.

Parameters FOR $PE_i$ ($1 \leq i \leq l$):
$n_1(i)$: $n_1$
$n_2(i)$: $2^i$
k(i): $n_1(2^{i-1}+1)-1$
$k_2(i)$: $n_2(i)/2$
$\pi(i)$: $\pi$
Sign(v, k):
1. Pick smallest i such that $k \leq k(i)$
2. Output $PE_i$.Sign(v, k(i))

The parameters for $PE_i$ are indicated using parenthesis around i. For example, $n_1(i)$ denotes the number of first level partitions of $PE_i$, and $n_2(i)$, the number of second level partitions, and so on. All l instances have the same number of first level partitions and use the same random permutation π of the dimensions. The number of second level partitions varies exponentially, and so does the hamming thresholds associated with the different instances.

In order to generate signatures for a vector v at hamming threshold k, the smallest i is identified such that k≦k(i), and $PE_i$ is used to generate signatures for v at a higher hamming threshold k(i), as shown in Step 2 of the above monotonic scheme. It can be shown that if i>j, the set of signatures generated by $PE_i$ for vector v at hamming threshold k(i) is a superset of the signatures generated by $PE_j$ for v at hamming threshold k(j); the monotonicity property of the monotonic scheme follows from this fact.

EXAMPLE 3

Figure 5:
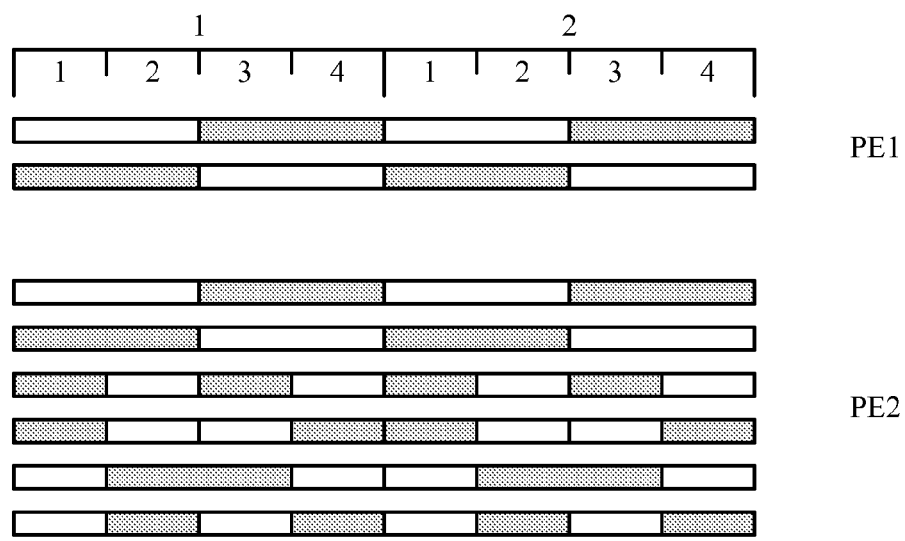
FIG. 5 illustrates a graph that represents results for a monotonic PARTENUM.

FIG. 5 illustrates a graph 500 that represents results for a monotonic PARTENUM. The values used are l=2 and $n_1$=2. $PE_1$ generates signatures for hamming threshold 3, and $PE_2$, for hamming threshold 5. As in FIG. 4, the signatures generated by $PE_1$ and $PE_2$ are indicated by rectangles, and the darkened portions of the rectangles indicate the dimensions that are projected to generate signatures. Note that the set of signatures generated by $PE_1$ at hamming threshold three is a subset of signatures generated by $PE_2$ at hamming threshold five.

Note that the choice of parameters for $PE_i$ reflect the theoretical results described earlier. The width w of each signature is given by $$\binom{m}{n_1}\binom{n_2-k_2}{n_2} = \binom{m}{2n_1},$$

implying $n_1$=m/2 w.

Now described is how the PARTENUM index can be realized in a disk-based setting, as embodied in FIG. 3. A component of the PARTENUM index is the hash table that stores signatures and sets, and for a given signature, retrieves all sets that generate that signature. An off-the-shelf disk-based hash table (or a B-tree index) can be used to realize this functionality. A different implementation for the hash table is now presented that greatly reduces the index size and improves the lookup performance. Begin by specifying a representation for PARTENUM signatures, since it is used to describe the hash table implementation.

Signature Representation. Fix a set s∈{1, ..., m} and let v denote its vector representation. Recall that each PARTENUM signature for s is of the form ⟨v[P], P⟩. An equivalent representation for this signature is ⟨s∩P, P⟩: two signatures are equal using the first representation iff they are equal using the second. The signature ⟨s∩P, P⟩ is represented as a string by concatenating the elements in (s∩P), followed by some string identifier for P. For the concatenation, some total ordering of the universe {1, ..., m} can be used so that smaller elements according to the ordering appear before the larger ones in the concatenation; this string representation of signatures is unique. As described below, a frequency based total ordering can be particularly beneficial.

Hash table Implementation. Recall that the term hash table is used to denote a data structure that indexes a collection of (key, value) pairs; multiple values can have the same key. Given a key, all values with that key are retrieved. For set-similarity indexes, the keys are signatures and values are sets.

The hash table construction exploits the fact that for set-similarity index of the general set-similarity index above, the hash table lookup need not be exact. Specifically, for a lookup involving a given signature the hash table can return a superset of sets that generate that signature, i.e., it can possibly return some sets that do not generate the given signature. This does not affect the correctness of set-similarity lookups, since false positive sets can be filtered out in Step 3 of the lookup operation of the general set-similarity index above. For disks, random access is expensive while sequential access is cheap, so it is useful to read and write data in large units called disk blocks, which is typically a few thousands of bytes. In the following, the parameter B is used to denote the number of sets that can be stored within a disk block. Since the sets that arise in data cleaning are of fairly small cardinalities (a few tens of elements), B is typically in the range 100 to 1000.

Following is a high-level description of an exemplary hash table construction.

Input: A collection ⟨signature, set⟩ pairs.
1. Sort input on signatures.
2. Divide sorted input into chunks, such that each chunk has exactly B distinct sets.
3. Store B distinct sets of each chunk in a disk block, so that contiguous chunks appear in contiguous disk blocks.
4. Store first signature of each chunk in boundary table.

The input to the hash table construction is the collection of ⟨signature, set⟩ pairs that need to be indexed. First, all the input pairs are sorted based on the lexicographic ordering of the signatures; recall that the signatures are strings. Then, the sorted list of input pairs is divided into contiguous chunks (partitions). Each chunk has the property that it has exactly B distinct sets; B is the number of sets that can fit in one disk block. Note that a chunk could have more than B ⟨signature, set⟩ pairs—this happens if a set appears multiple times in the same chunk with different signatures. The B distinct sets are stored in each chunk in a disk block (in any order), ensuring that the sets of contiguous chunks go to contiguous disk blocks. In addition, the first signature of every chunk is stored in a separate table called the boundary table. The boundary table is about a factor B (2 or 3 orders of magnitude) smaller than the input, so it can be stored completely in memory.

Following is a table of input pairs for Example 4.

| ⟨$sg_1, s_3$⟩ | ⟨$sg_1, s_4$⟩ | ⟨$sg_3, s_1$⟩ | ⟨$sg_3, s_2$⟩ |
|---|---|---|---|
| ⟨$sg_4, s_2$⟩ | ⟨$sg_5, s_1$⟩ | ⟨$sg_6, s_4$⟩ | ⟨$sg_6, s_3$⟩ |

EXAMPLE 4

Consider the eight signature-pairs shown. The subscripts of the signatures encode the lexicographic ordering of the signatures ($sg_1 < sg_2 < ...$). Let B=2. Then the sorted input list can be divided into three chunks. The first chunk is {⟨$sg_1, s_3$⟩, ⟨$sg_1, s_4$⟩}, the second, {⟨$sg_3, s_1$⟩, ⟨$sg_3, s_2$⟩, ⟨$sg_4, s_2$⟩, ⟨$sg_5, s_1$⟩}, and the third, {⟨$sg_6, s_4$⟩, ⟨$sg_6, s_3$⟩}. Note that the second chunk consists of four signature-set pairs but exactly two distinct sets $s_1$ and $s_2$. Following are the resulting disk blocks and the boundary table.

| 0 | 1 | 2 | 0 | 1 | 2 |
|---|---|---|---|---|---|
| $s_3 s_4$ | $s_1 s_2$ | $s_3 s_4$ | $sg_1$ | $sg_3$ | $sg_6$ |
| Disk Blocks | | | Boundary Table | | |

For any signature, using the boundary table, a contiguous set of disk blocks can be identified such that any input set that generates the signature is guaranteed to be in one of the disk blocks; for lookups involving the signature, simply return all sets in these blocks. In Example 4, any set that generates $sg_1$ as one of its signatures is guaranteed to be stored in disk block 0. Therefore, return the two sets $s_3$ and $s_4$ as results for the hash table lookup for signature $sg_1$. As this example illustrates, the hash table lookup for a signature may return some input sets that do not generate the signature. But as described earlier, this does not affect the correctness of the set-similarity index using the hash table. Further, the number of such false positive sets is bounded by 2 B, so the cost of processing these sets is amortized by the random I/O cost to access the disk blocks.

This lack of hash table lookup accuracy provides at least two benefits. First, the space required by the hash table is smaller compared to that required by an off-the-shelf hash table implementation. For example, a hash table of the disk blocks stores only one copy each of sets $s_1$ and $s_2$, while any regular hash table would have stored two copies of each, one for each signature.

Such hash table compression happens when signatures of a set appear close to one another in the sorted list of signature-sets. Second, and more importantly, the lower space requirement translates to fewer disk I/Os and therefore better lookup performance. These benefits turn particularly compelling if information about frequency of elements is used for signature representation.

Using Frequency of Elements. Recall from above that the signature ⟨s∩P, P⟩ is represented as a string by concatenating the elements of s∩P, based on some total ordering of the elements. An ordering that is particularly beneficial is the one based on element frequencies: the representation for the signature ⟨s∩P, P⟩ is of the form $e_1 \cdot e_2 \cdot \ldots$, where $e_1$ is the least frequent element in s∩P, $e_2$ the next least frequent, and so on. (Frequency of an element is the number of input sets in which the element occurs.) This ordering is beneficial.

Informally, the frequency-based ordering tends to cluster together the signatures of a set, leading to better compression of the hash table. As an exaggerated example, consider an input set $s_i$ containing an element e of frequency one, that is, e occurs only in $s_i$ and no other input set. All signatures involving element e have a representation of the form $e \cdot \ldots$, and so, appear contiguously in the sorted list of signature-sets; all these are compressed to a single entry in the hash table. Note that since a "look-ahead" of B sets occurs during hash table construction, such benefits can be obtained even for elements of frequency up to B. Similar benefits are obtainable during set-similarity lookups as well. Consider a lookup involving query q, and let q have an element e with frequency one (in the input sets). All input sets that possibly generate a signature containing element e usually occur within a single disk block, so the multiple hash table lookups involving signatures of q containing element e, translate to a single disk seek.

Now consider PARTENUM indexing for weighted sets, where there is a weight w(e) associated with each element e. For many applications using set-similarity, some elements are more important than others for the purpose of defining similarity, and using weights is a way of naturally capturing the importance of elements. A well-known example of weights is inverse document frequency (IDF) originally proposed in Information Retrieval. PARTENUM can be used for weighted sets by converting a weighted set into an unweighted one by making w(e) copies of an element e (with appropriate rounding). For general weights, this approach is not very satisfactory since by simply scaling all weights by a factor α, all thresholds increase by α, requiring a larger number of signatures. However, for the common case of IDF-based weights, the disk-based PARTENUM works fairly well. To get an intuition for why this is the case, consider an element e∈s with frequency one which has, by definition, a very high IDF. This element occurs in a large number of signatures of s due to its multiple copies. All these signatures have a representation of the form $e \cdot \ldots$ and are therefore compressed into a single hash table entry.

Following is a description of locality-sensitive hashing based indexes for set-similarity. A modification of the basic LSH index is provided that is useful in a disk-based implementation. The description begins with a review of basic LSH indexes, before presenting the modification.

LSH indexes, as the name suggests, are based on the concept of locality sensitive hash functions. Informally, a locality sensitive hash function hashes similar objects to the same value with high probability. For Jaccard similarity, there exists a locality sensitive hash function called the minhash function. A minhash function is defined using a permutation $\pi$ of $\{1, \ldots, m\}$. The minhash of a set $s \subseteq \{1, \ldots, m\}$ for permutation $\pi$, denoted $mh_\pi(s)$, is defined as the smallest element of s under permutation $\pi$. Formally, $$mh_\pi(s) = \min\{\pi(e): e \in s\}$$

If $\pi$ is picked at uniformly at random from among all permutations, it can be shown that:

$$Pr[mh_\pi(s_1) = mh_\pi(s_2)] = \Im_s(s_1, s_2)$$

Thus, similar sets are more likely to have the same minhash than dissimilar sets. In the following, the subscript $\pi$ is dropped from $mh_\pi$. Instead, subscripts (e.g., $mh_1, mh_2, \ldots$) are used to represent different minhash functions, i.e., functions using different permutations. Further, permutations for different minhash functions are picked independently and uniformly at random.

Following is an exemplary minhash-based signature scheme for an LSH index.

Parameters
g Signature width
l Max number of signatures
δ False positive rate
$mh_{ij}$ Minhash functions ($1 \leq i \leq l$), ($1 \leq j \leq g$)
Signature Generation
1. Sign(s, θ)=φ
2. for i=1,2, . . . ,
3. Sign(s, θ)=Sign(s, θ)+⟨$mh_{i1}(s), \ldots mh_{ig}(s)$⟩
4. If $(1-\theta^g)^i \leq \delta$ break Each signature for a set is a concatenation of g minhashes of the set; g is the signature width parameter that can be varied to control the performance of LSH. The number of signatures for a given set depends on δ, the false positive rate, g, and θ: it is the smallest integer i such that $(1-\theta^g)^i \leq \delta$. The correctness of the signature scheme follows from the locality sensitive property of minhashes discussed above.

Just as in the case of PARTENUM, the width of signatures, g, plays a role in the performance of LSH indexes, since it influences the number of input sets that share a given signature. It can be shown that the performance of LSH indexes drops rapidly when moving away from the optimal value for g. The optimal value for g depends on the distribution of input sets around the query set—so no single value might be optimal for all queries. Informally, it can be shown that the optimal value for g is the one for which the expected number of input sets that share a signature is one in a main memory setting, and B, the number of sets that fit in a block, when the hash tables are disk-resident.

A simple solution for picking the right value of g is unknown. Note that g is fixed at index construction time, so changing the value of g requires a complete index rebuild.

A simple modification to LSH indexes is now described that does not require fixing the value of g at index construction time. The value of g can be specified at lookup time, and lookup behaves as if the index were constructed using that value of g. While this does not solve completely the problem of picking the correct g, it makes the problem more tractable in practice. For example, the value of g used for lookups can be varied, depending on the performance of previous lookups, without having to rebuild the index from scratch.

The modification is based on the idea that hash tables used in the general set-similarity index described above can be approximate, and return false positives, since these are ultimately filtered out subsequently.

The original minhash based signature scheme above uses a sequence of g minhash functions for each signature index i. Instead, now associate (conceptually) an infinite sequence of minhash functions with each signature index i, denoted $mhi_1$, $mhi_2$ .... Define a total ordering<over sets using this infinite sequence. Specifically, for any two sets r and s, it can be said that r<s iff there exists a j such that $mh_{ij}(r)<mh_{ij}(s)$ and for all j'<j, $mh_{ij}'(r)=mh_{ij}'(s)$. This is essentially the lexicographic ordering the minhash sequence of the sets. Note that different minhash function sequences are associated with different signature indexes, and each defines a different total ordering.

At index construction time, for each signature index i($1 \leq i \leq 1$), sort the input sets $s_1, \ldots, s_n$ on the total ordering induced by the minhash function sequence associated with index i. The sorted list of input sets is stored in contiguous disk blocks. The sets occurring at block boundaries are stored in a separate boundary table. For small sized sets, the boundary table is 2-3 orders of magnitude smaller than the actual input, so it can be stored completely in memory. Note that there are l different sorted lists of input sets. The space required for these l sorted lists is the same as that of the hash table of the original LSH index.

LSH similarity lookups can now be supported with any value of parameter g as follows. For any signature index i, all input sets that agree with the query set q on the first g minhashes $mh_{i1}, \ldots, mh_{ig}$, by construction, occur contiguously in the sorted list for index i. The contiguous disk blocks that these sets occur in can be identified using the boundary table. Therefore, replace the hash table lookup involving the key $\langle mh_{i1}(q), \ldots, mh_{ig}(q) \rangle$ with a lookup that returns all the sets in the above identified blocks. There can be some sets in these blocks that do not agree with q on the first g minhashes that are returned by the lookup. This does not affect correctness, since these sets are filtered out if the sets happen to be false positives, but do introduce an additional processing overhead. However, this overhead is limited to 2 B sets (B denotes the number of sets that can be stored per block), the cost of which is amortized by the random seek to retrieve the blocks.

Following are a series of flow charts that represent methodologies associated with various aspects described herein.

Figure 6:
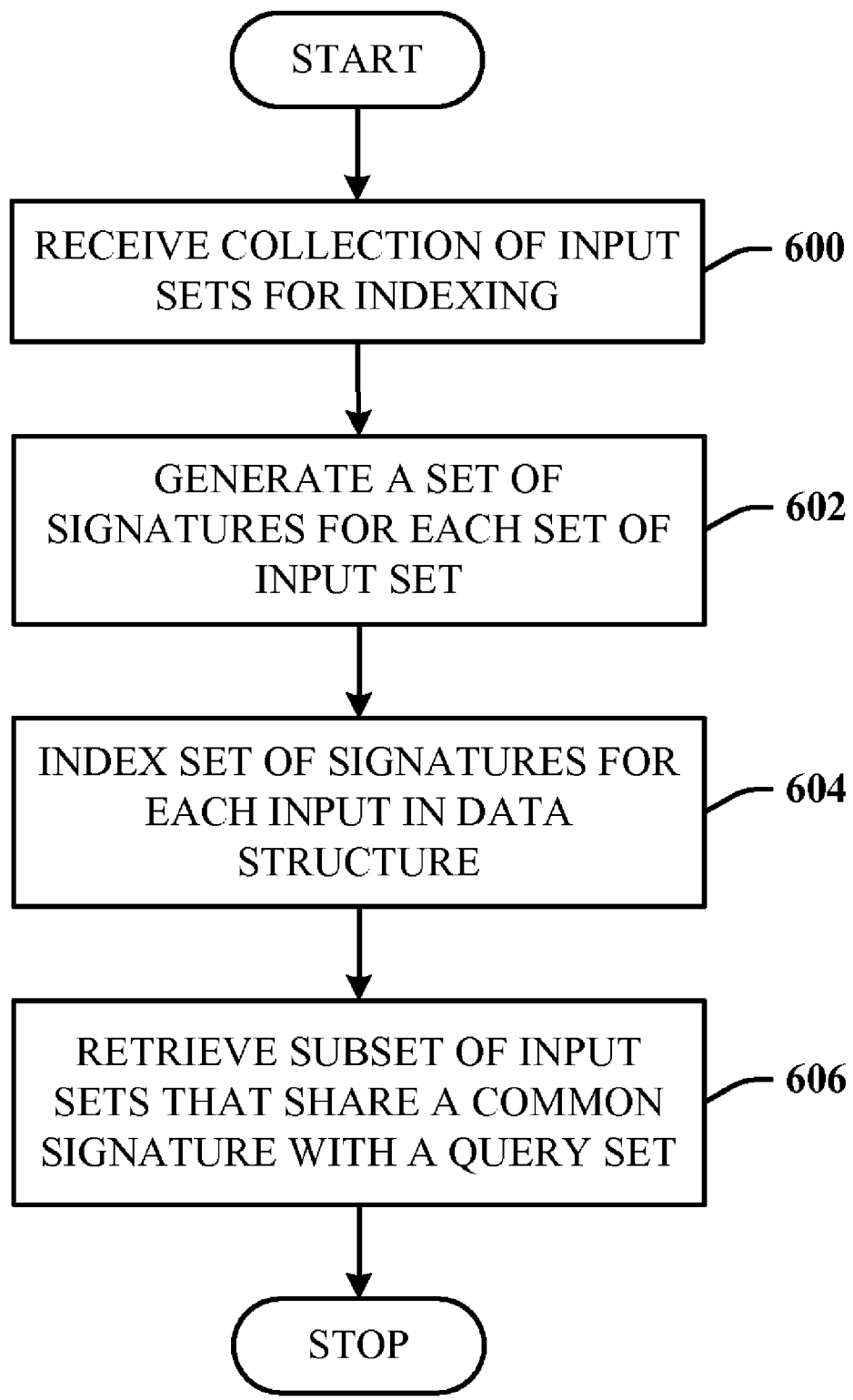
FIG. 6 illustrates a computer-implemented method of indexing data.

FIG. 6 illustrates a computer-implemented method of indexing data. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, a collection of input sets is received for indexing. At 602, a set of signatures is generated for each input set. At 604, the set of signatures is indexed for each input set in a data structure. At 606, a subset of the input sets that share a common signature with a query set is retrieved.

Figure 7:
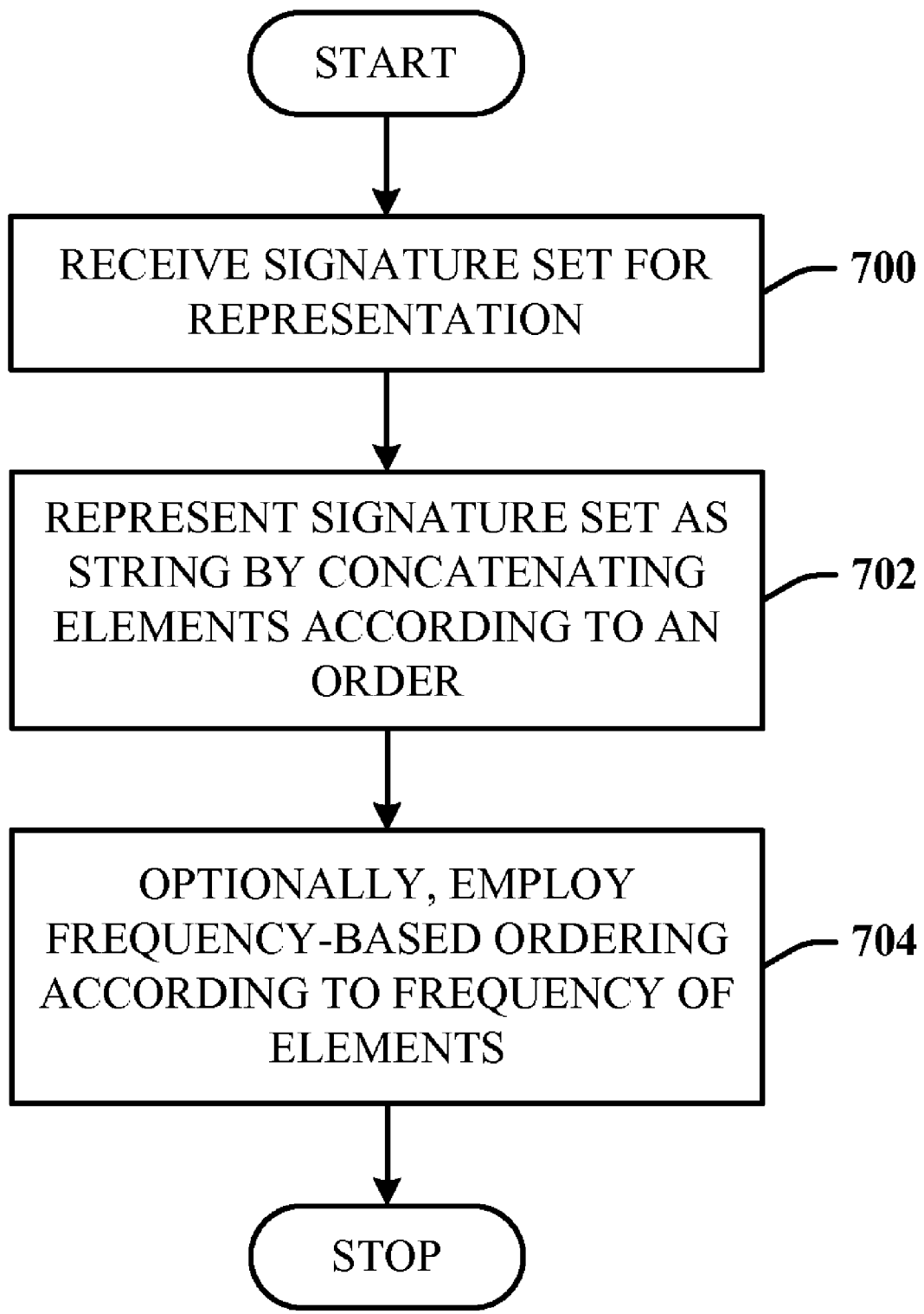
FIG. 7 illustrates a method of representing a signature as a string.

FIG. 7 illustrates a method of representing a signature as a string. At 700, a signature set is received. At 702, the signature set is represented as a string by concatenating elements according to an order. At 704, optionally, employ frequency-based ordering according to the frequency of elements that occur.

Figure 8:
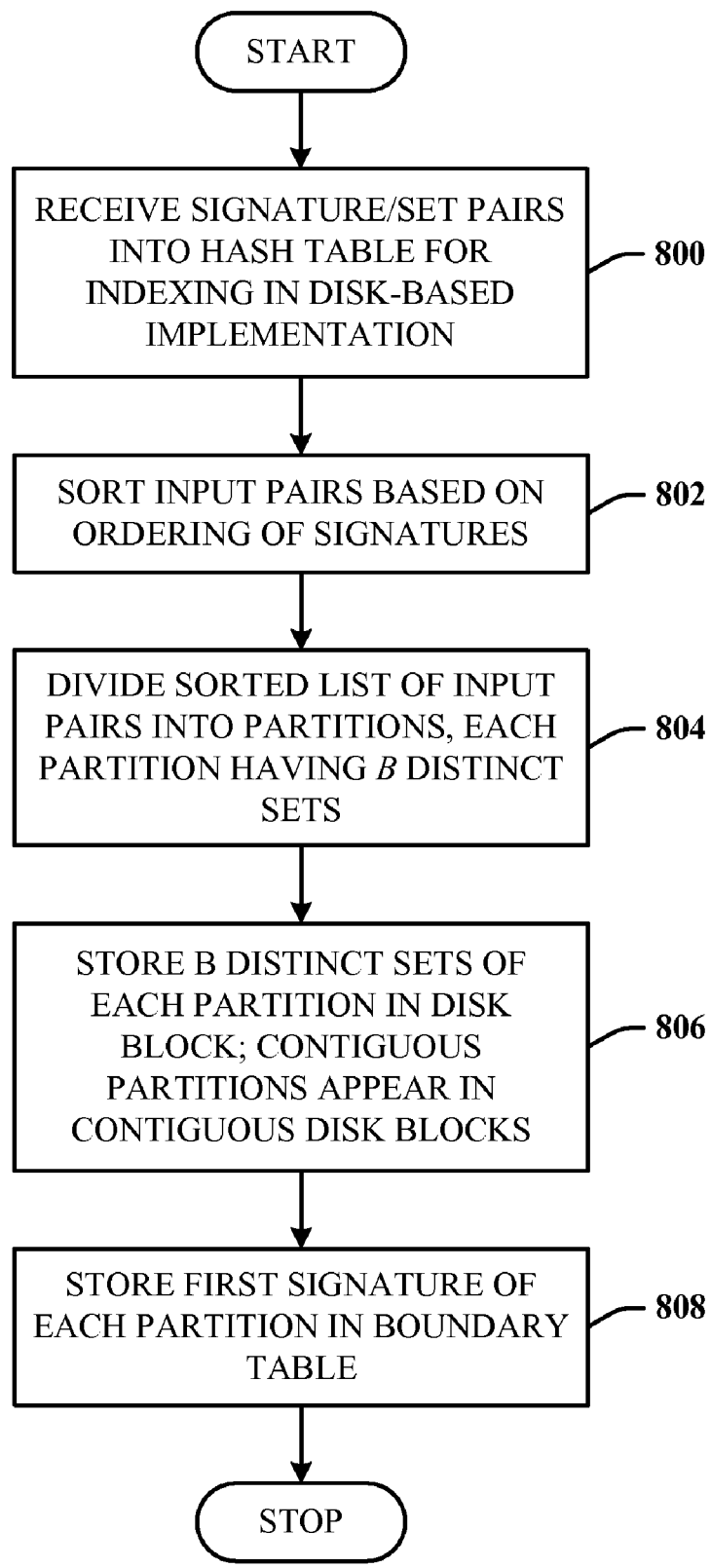
FIG. 8 illustrates a method of employing a hash table for a disk-based implementation.

FIG. 8 illustrates a method of employing a hash table for a disk-based implementation. At 800, signature/set pairs are received into a hash table for indexing in a disk-based implementation. At 802, the input pairs are sorted based on ordering of the signatures. At 804, the sorted list of input pairs is divided into partitions, each partition having B distinct sets. At 806, the B distinct sets of each partition are stored in disk blocks where contiguous partitions appear in contiguous disk blocks. At 808, the first signature of each partition is then stored in a boundary table.

Figure 9:
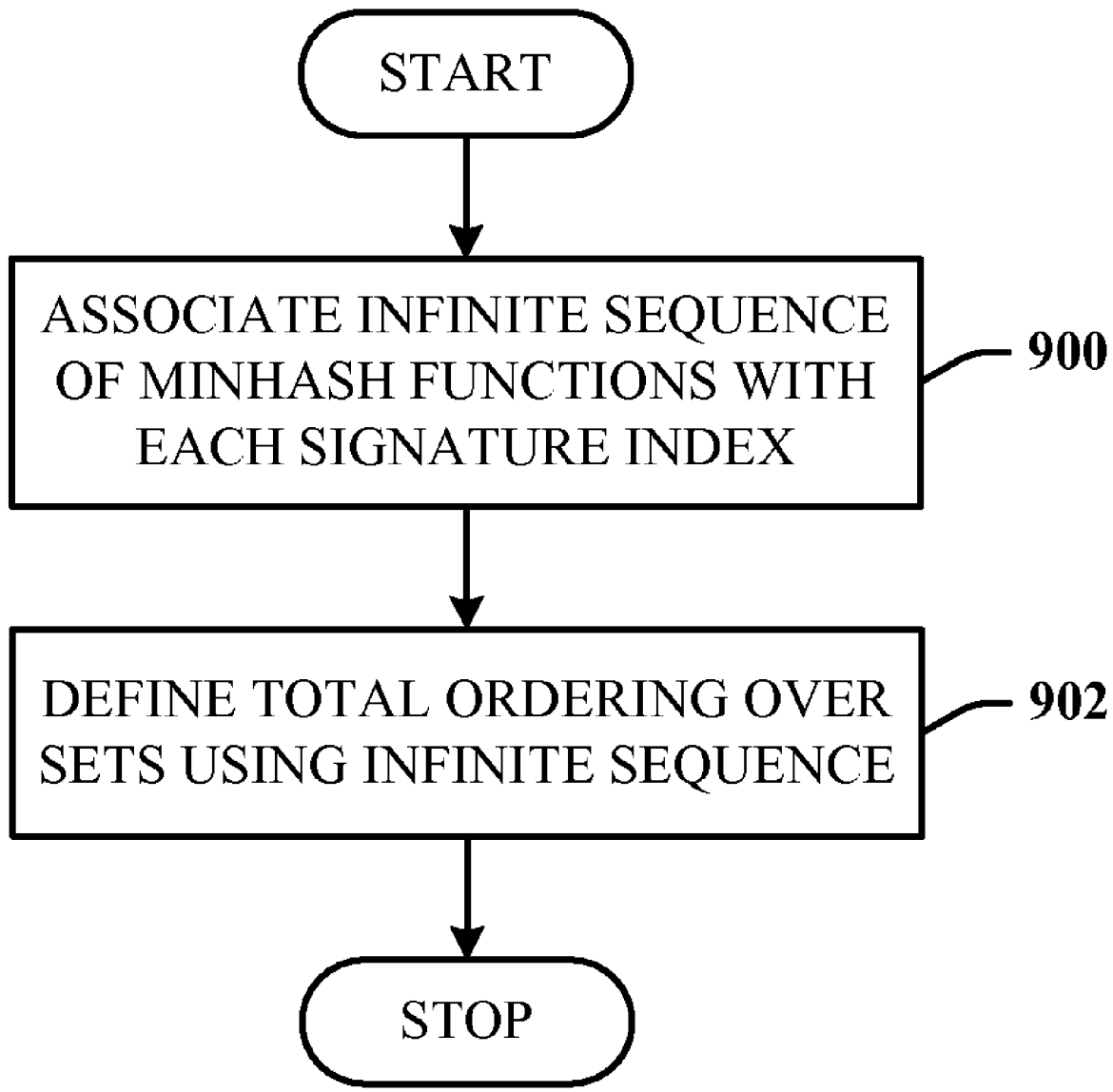
FIG. 9 illustrates a method of processing set-similarity lookups independent of signature width.

FIG. 9 illustrates a method of processing set-similarity lookups independent of signature width. At 900, an infinite sequence of minhash functions is associated with each signature index. At 902, a total ordering is defined over the sets using the infinite sequence.

Figure 10:
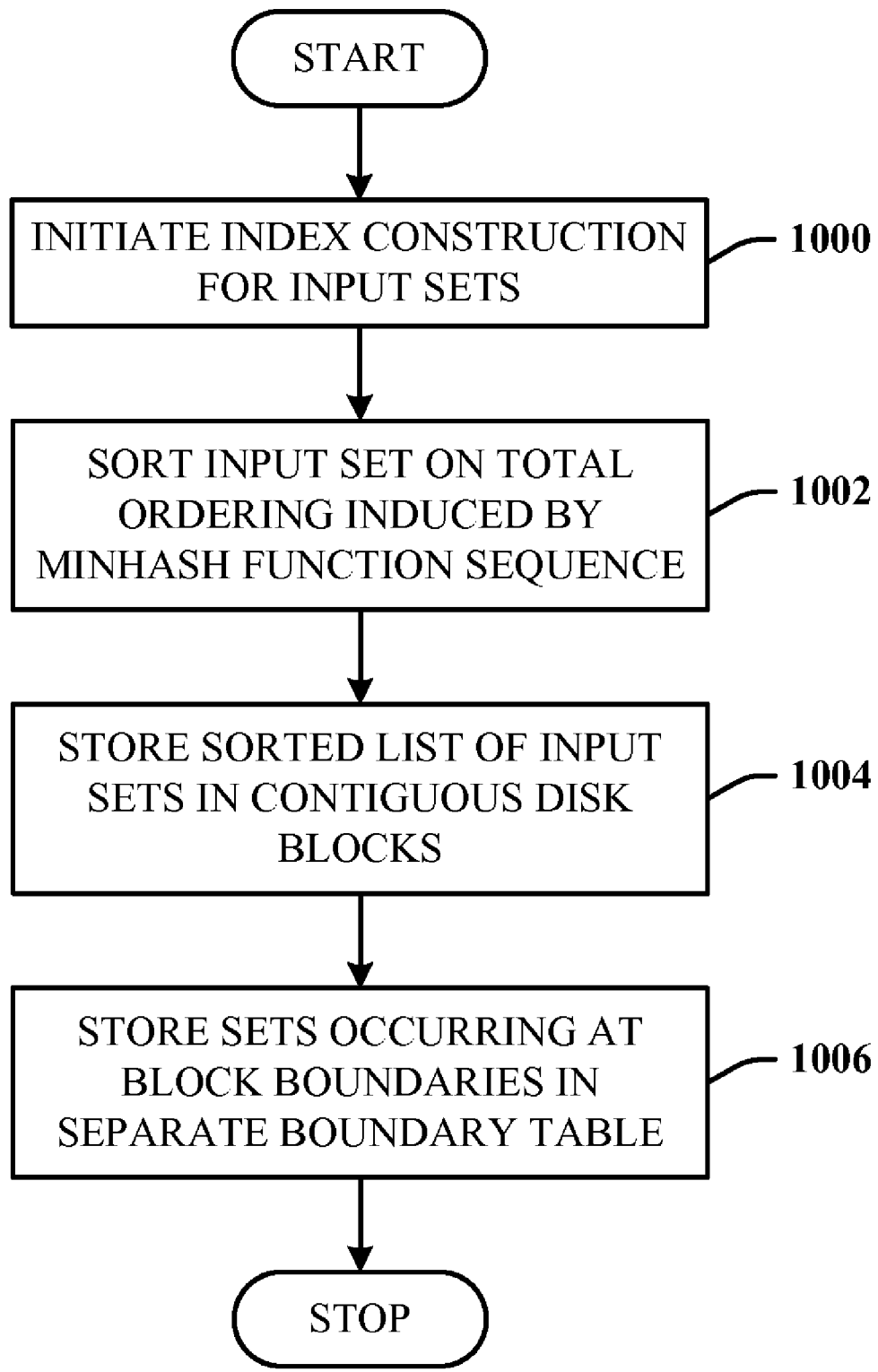
FIG. 10 illustrates a method of processing signatures at index construction time on input sets.

FIG. 10 illustrates a method of processing signatures at index construction time on input sets. At 1000, index construction is initiated. At 1002, the input set is sorted based on the total ordering induced by the minhash function sequence. At 1004, the sorted list of input sets is stored in contiguous disk blocks. At 1006, set of inputs occurring at the block boundaries are stored in a separate boundary table.

Figure 11:
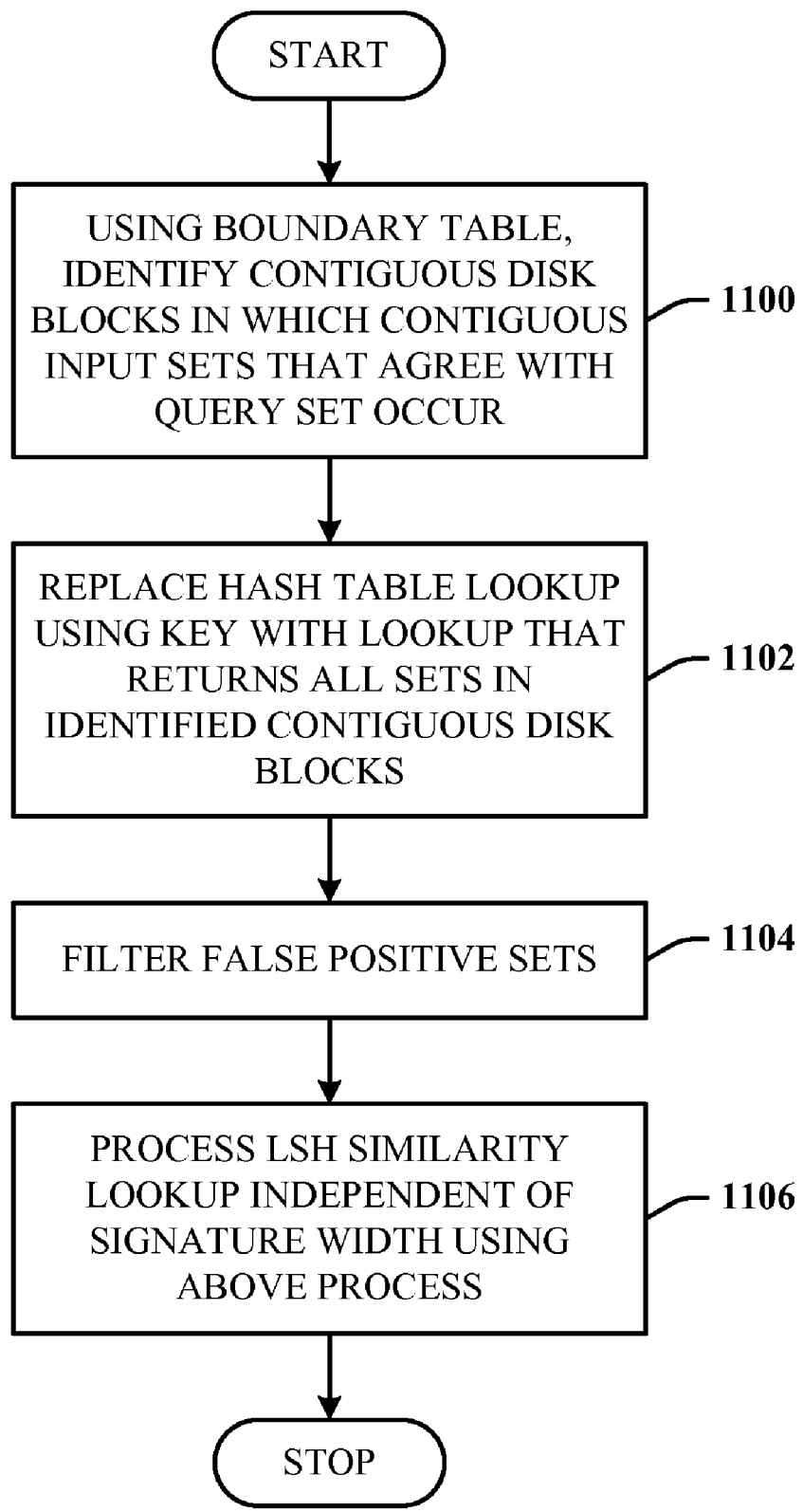
FIG. 11 illustrates a method of processing LSH-based set-similarity lookups independent of signature width.

FIG. 11 illustrates a method of processing LSH-based set-similarity lookups independent of signature width. At 1100, using the boundary table, identify the contiguous disk blocks in which contiguous input sets that agree with the query set, occur. At 1102, the hash table lookup is replaced with a lookup that returns all sets identified in the contiguous disk blocks. This is based on a key. At 1104, false positive sets are filtered. At 1106, the LSH set-similarity is processed independent of the signature width using the above processes.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
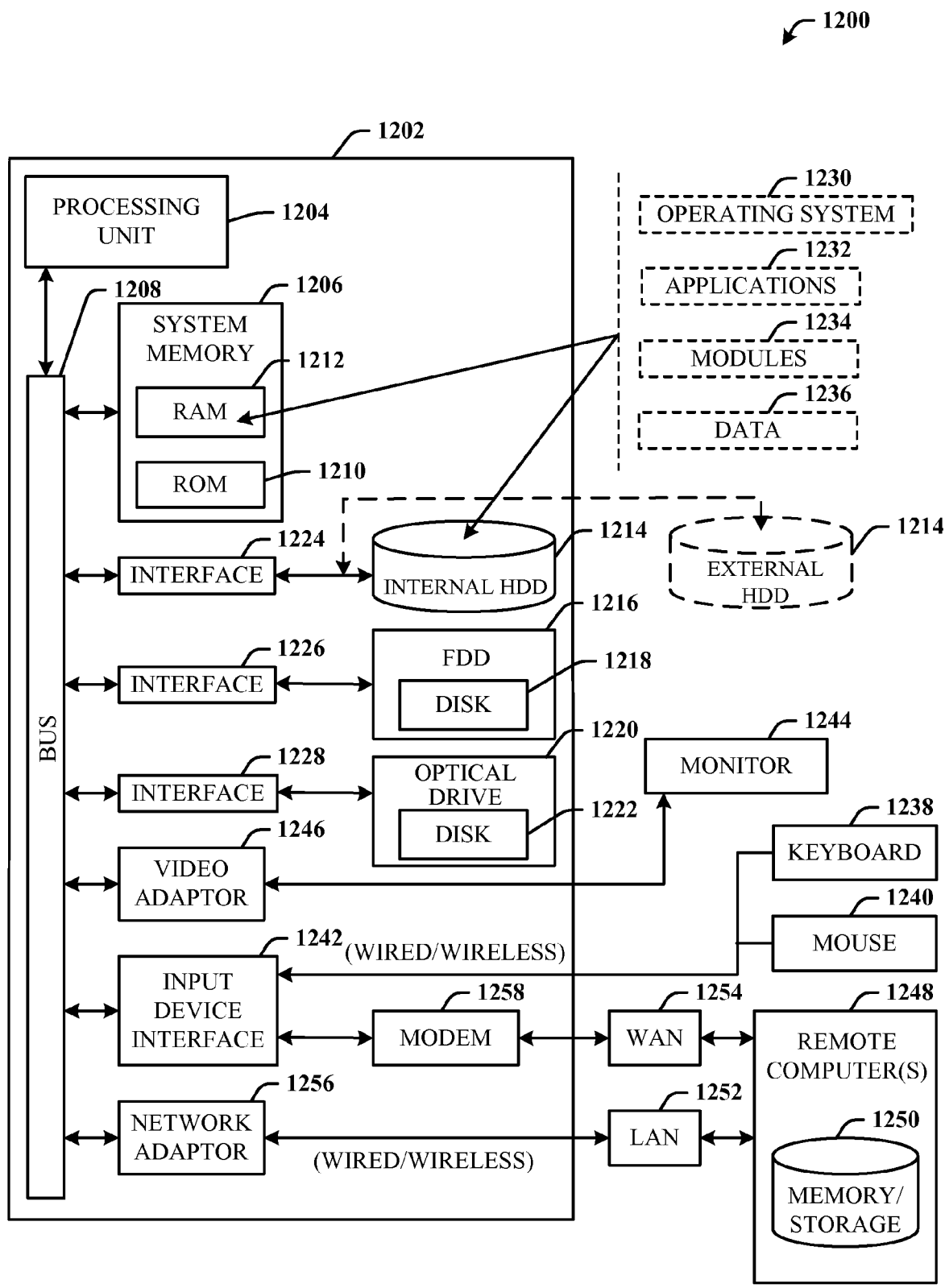
FIG. 12 illustrates a block diagram of a computing system operable to execute set-similarity processing in accordance with the disclosed architecture.

Referring now to FIG. 12, there is illustrated a block diagram of a computing system 1200 operable to execute set-similarity processing in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The drive 1214 can employ the set-similarity lookup architecture described herein. The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1212, including an operating system 1230, one or more application programs 1232, other program modules 1234 and program data 1236. The one or more application programs 1232, other program modules 1234 and program data 1236 can include the index building component 102, collection of sets 104, the index structure 106, the signature scheme 108 and index lookup component 110 of FIG. 1 and, the mapping component 202 and collection of strings 203 of FIG. 2, for example.

All or portions of the operating system, applications, modules, and/or data can also be cached in the RAM 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the local network 1252 through a wire and/or wireless communication network interface or adapter 1256. The adaptor 1256 may facilitate wire or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 13:
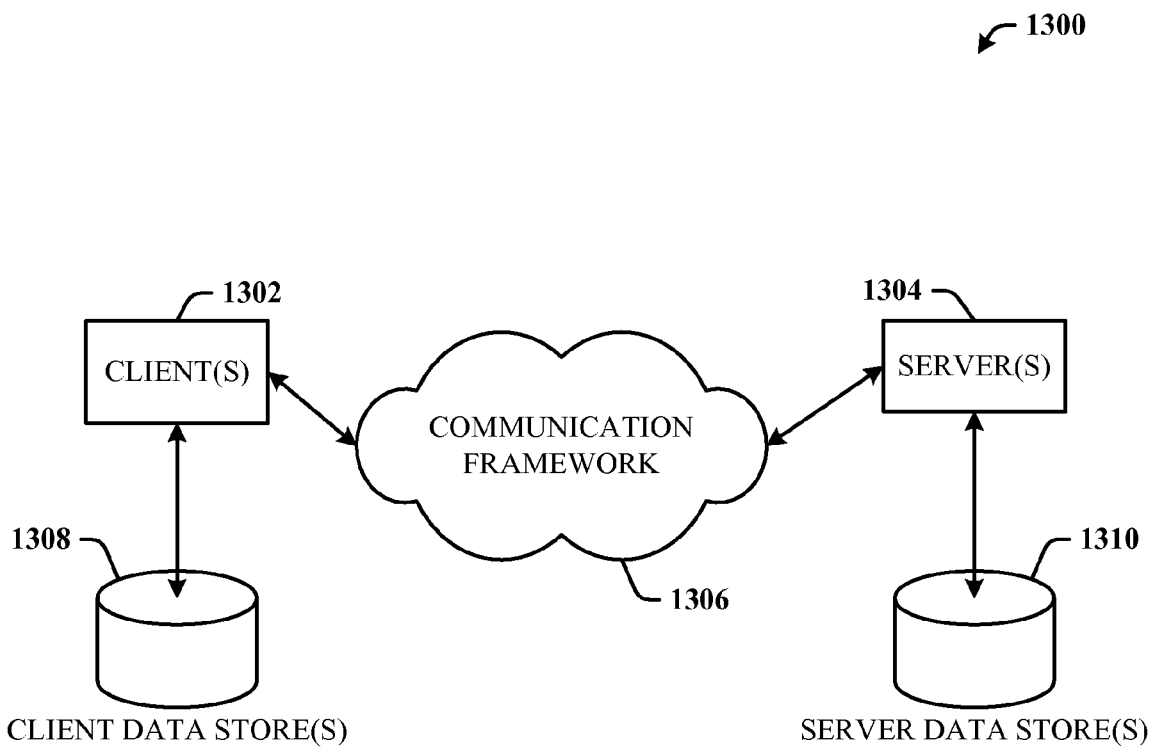
FIG. 13 illustrates a schematic block diagram of an exemplary computing environment that can support set-similarity processing in accordance with the disclosed architecture.

Referring now to FIG. 13, there is illustrated a schematic block diagram of an exemplary computing environment 1300 that can support set-similarity processing in accordance with the disclosed architecture. The system 1300 includes one or more client(s) 1302. The client(s) 1302 can be hardware and/or software (e.g., threads, processes, computing devices). The client(s) 1302 can house cookie(s) and/or associated contextual information, for example.

The system 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304. The clients 1302 and the servers 1304 can employ the disk-based set-similarity lookup architecture described herein.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented indexing system, comprising:
a processor coupled to a memory, the memory having a plurality of components stored thereon, said components comprising:
an index building component employing a signature scheme for building an index structure over an input collection of sets, wherein the signature scheme generates a set of signatures for the input collection of sets, wherein each signature of the set of signatures is based on a corresponding set of the input collection of sets, and wherein each signature is represented as a string by concatenating string elements based on an ordering of the elements, the string elements based on a sequence of minhash functions applied to the corresponding set and the ordering based on element frequencies; and
an index lookup component for identifying individual sets in the input collection that are similar to a given query set.

2. The system of claim 1, wherein an output of the index lookup component is exact.

3. The system of claim 1, wherein the index structure is stored on a disk.

4. The system of claim 1, wherein the index lookup component performs a set-similarity lookup that is threshold-based.

5. The system of claim 1, wherein the index lookup component employs a similarity function that is one of Jaccard similarity, hamming distance or a function that is lower bounded by one of the Jaccard similarity or hamming distance.

6. The system of claim 1, wherein the signature scheme is based on partitions of a multidimensional binary vector representation of sets.

7. The system of claim 6, wherein the signature scheme is further based on enumeration of the partitions.

8. The system of claim 1, further comprising a mapping component for converting a collection of input strings into the collection of sets, the index lookup component further identifies all sets of the collection that are similar to a query string.

9. The system of claim 8, wherein the query string is processed into the query set for set-similarity processing.

10. A computer-implemented method of indexing data, comprising:
   receiving a collection of input sets for indexing;
   generating a set of signatures for the collection of input sets, wherein each signature of the set of signatures is based on a corresponding input set of the collection of input sets, wherein each signature is represented as a string by concatenating string elements based on an ordering of the elements, the string elements based on a sequence of minhash functions applied to the corresponding input set and the ordering based on element frequencies;
   indexing the collection of input sets based on the corresponding signatures in a data structure;
   storing the data structure on a disk; and
   retrieving a subset of input sets that share a common signature with a query set.

11. The method of claim 10, further comprising removing false positives from the subset.

12. The method of claim 10, further comprising compressing a data structure that stores the set of signatures.

13. The method of claim 10, wherein the string elements carry a weight, and the ordering is further based on element weights.

14. The method of claim 10, further comprising using a monotonic signature scheme for a hamming distance for the input sets.

15. A computer-implemented system, comprising:
   a processor coupled to a memory;
   computer-implemented means for receiving input sets for indexing;
   computer-implemented means for generating signature sets associated with individual input sets;
   computer-implemented means for indexing individual signature sets and associated individual input sets in a data structure; and
   computer-implemented means for retrieving and outputting a subset of input sets that share a common signature with a query set.

16. The system of claim 15, further comprising computer-implemented means for converting a collection of strings into the input sets and outputting the subset based on a set-similarity function.

* * * * *